Dec. 24, 1968    J. F. GILDAY ET AL    3,417,729
ROTOR BLADE STRIKE INDICATOR

Filed March 4, 1966    2 Sheets-Sheet 1

JOHN F. GILDAY
GEORGE L. RODRIGUEZ
INVENTORS

BY *George Galenstein*

United States Patent Office 3,417,729
Patented Dec. 24, 1968

3,417,729
ROTOR BLADE STRIKE INDICATOR
John F. Gilday, Fort Worth, and George L. Rodriguez, Arlington, Tex., assignors to Bell Aerospace Corporation, Wheatfield, N.Y.
Filed Mar. 4, 1966, Ser. No. 531,896
1 Claim. (Cl. 116—114)

ABSTRACT OF THE DISCLOSURE

A tab is attached to the outer end of a rotor blade extending beyond at least a portion of the rotor blade's curvatured leading edge and being yieldable in a direction parallel to the longitudinal axis of the rotor blade. Permanent yielding of the tab will indicate the striking of foreign material such as water, weeds, etc.

---

This invention relates to rotary wing aircraft and, in particular, to the rotor blades of rotary wing aircraft.

One of the hazards in operating rotary wing aircraft over water is that of permitting a blade or blades to enter or strike the water, which may occur upon landing or takeoff or while hovering close to the surface of the water. It has been recognized for some time that such an occurrence will impose a severe shock load upon the rotor blade and/or connecting parts and that they may have suffered such internal damage as to reduce their otherwise allowable operating life. By allowable operating life is meant the time for which it is permissible to use the part under normal operating conditions.

It is an object of the present invention to provide a readily visible means to indicate when the rotor blade has struck water.

It is also an object to provide a water-strike indicator that does not unduly detract from rotor performance.

It is an additional object to provide a water-strike indicator that can be inexpensively fabricated and that can be easily attached to existing rotor blades.

Figure 1:
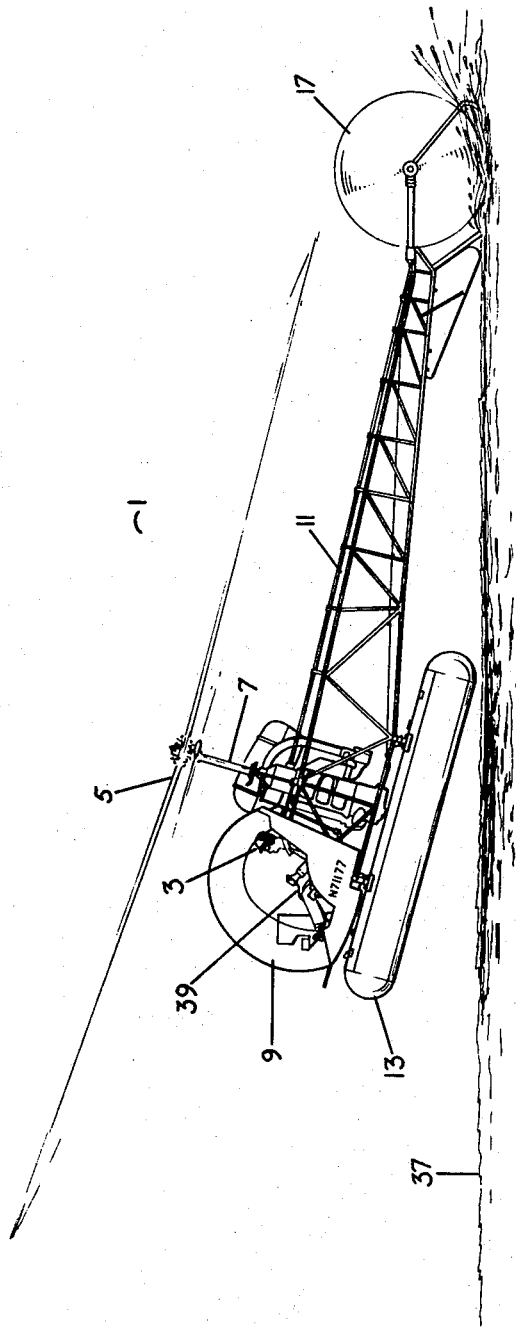
FIGURE 1 is a view in perspective of an operating helicopter in which, upon landing, the pilot has caused the tail rotor to enter the water.

Referring to FIG. 1, the pilot 3, operating helicopter 1 with pontoons 13 for operation over water 37, has moved the cyclic control stick 39 aft so as to cause the rotor 5 to incline backwardly and decrease the forward speed of the helicopter preparatory to landing. The rearward inclination of the rotor 5 in turn has imposed a rearward movement on the top of the mast 7, to which it is attached, causing the mast 7, fuselage 9 and tail boom 11 to also incline backwardly as shown, which has caused the tail rotor 17 to be carried downwardly and strike the water 37.

Figure 2:
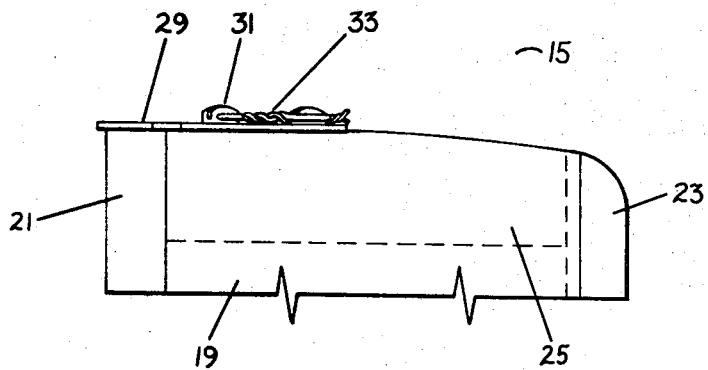
FIGURE 2 is a partial plan view of a tail rotor blade with a water-strike indicator.
Figure 3:
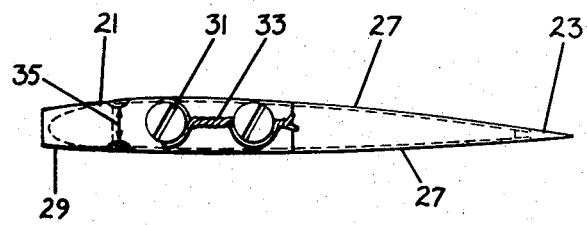
FIGURE 3 is an end view of the tail rotor of FIGURE 2.

Referring to FIGS. 2 and 3 illustrating the outer portion of the tail rotor blade 15, the leading edge spar 21, trailing edge spar 23 and outboard core 25, are bonded together and to upper and lower skins 27.

Indicator tab 29 is attached to the outboard end of the tail rotor blade 5 by screws 31 which are threadedly connected to the core 25 and are secured in position by lockwire 33.

As shown, the tab 29 approximates the airfoil shape of the tail rotor blade 17 except in the forward or leading edge portion where it extends beyond the leading edge spar 21.

Figure 4:
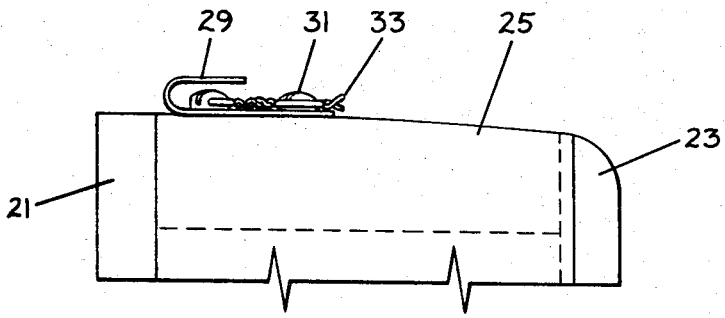
FIGURE 4 is a partial plan view of a tail rotor with a water-strike indicator after engaging in a water-strike.

It should be clear that if the rotating blade strikes water, the tab will be bent by the force of the strike so as to assume the position shown in FIG. 4.

It will be noted (FIG. 3) that the tab 29 is dimensioned at 30 so that, taking into account its thickness, material, rotor speed etc. it will not be bent by air forces during flight but will be bent by a water strike. It has been determined that the proper dimensions of the tab can easily and accurately be established for each particular application by cut and dry methods under actual flight conditions.

It is evident that no more than casual inspection is required to observe that the tab in FIG. 4 deviates from its normal shape and that a strike has occurred.

Although only one embodiment of the invention has been illustrated and described, it will be understood that numerous changes and modifications can be made thereto without departing from the spirit of the invention or the scope of the appended claims.

We claim:
1. An impact indicator for a rotor device comprising a plurality of rotor blades
 (a) each of said blades having inner and outer ends and a curvatured leading edge,
 (b) a deformable tab connected to at least one of said blades adjacent said outer end and extending beyond at least a portion of said curvatured leading edge,
 (c) said tab being yieldable in a direction parallel to the longitudinal axis of said rotor blade, whereby striking of foreign material by the rotor blade may be detected by deformation of said tab.

References Cited

UNITED STATES PATENTS

| | | | |
|---|---|---|---|
| 3,167,965 | 2/1965 | Peterson | 116—114 |
| 3,181,815 | 5/1965 | Paul | 244—17.11 |

LOUIS J. CAPOZI, *Primary Examiner.*

U.S. Cl. X.R.

170—160.22; 244—1